United States Patent [19]

Klomfass

[11] Patent Number: 4,707,015

[45] Date of Patent: Nov. 17, 1987

[54] SELF INFLATABLE AIR DEFLECTOR

[75] Inventor: Roy D. Klomfass, Edenvale, South Africa

[73] Assignee: Jorn Laursen, Pretoria, South Africa; a part interest

[21] Appl. No.: 908,668

[22] Filed: Sep. 17, 1986

[30] Foreign Application Priority Data

Sep. 20, 1985 [ZA] South Africa ............. 85/7231
Mar. 27, 1986 [ZA] South Africa ............. 86/2318

[51] Int. Cl.⁴ .................................................. B62D 35/00
[52] U.S. Cl. ..................................................... 296/1 S
[58] Field of Search ................................... 296/1 S, 91

[56] References Cited

U.S. PATENT DOCUMENTS

| 3,945,677 | 3/1976 | Servais et al. | 296/1 S |
| 4,553,781 | 11/1985 | Johnson | 296/1 S |
| 4,560,195 | 12/1985 | Price et al. | 296/1 S |

FOREIGN PATENT DOCUMENTS 2511700 9/1976 Fed. Rep. of Germany .
3115742 11/1982 Fed. Rep. of Germany .

*Primary Examiner*—Robert R. Song
*Attorney, Agent, or Firm*—Banner, Birch, McKie & Beckett

[57] ABSTRACT

An air deflector of the type adapted to be self-inflating in consequence of movement of an asociated vehicle or transport container is provided. The deflector comprises an inflatable member having an air inlet which is defined by a rigid frame held outwardly in front of the frontal wall of the vehicle or container. The air inlet is generally held in a forwardly projected position by an arm supported at the end thereof opposite the inlet either directly by the vehicle or through its being secured to the inflatable member which in turn is secured to the vehicle. The air deflectors are easily removable and can be folded or collapsed for storage and transport. They are accordingly well suited for use on transport containers, caravans as well as road transport vehicles and the like.

20 Claims, 9 Drawing Figures

SELF INFLATABLE AIR DEFLECTOR

FIELD OF THE INVENTION

This invention relates to air deflectors particularly self inflatable air deflectors, which are employed to improve the aerodynamics or streamlining of vehicles with the object of reducing the wind resistance of the vehicle. In this specification the term "vehicle" is used to include not only all road transport vehicles, caravans, etc. but also shipping and transport containers which can be mounted on a trailer, ship's deck, flat bed rail car or the like in order to be conveyed from one place to another. Thus use of the air deflectors is not confined to road transport vehicles.

BACKGROUND TO THE INVENTION

Air deflectors are commonly employed on caravans and large trucks but it has been found that when they are of a rigid construction they are cumbersome, difficult to attach to a vehicle and equally difficult and inconvenient to store or transport when not in use. One particularly popular and successful configuration of such rigid deflectors is one which assumes the form of a bubble or dome on at least the upper part of the flat frontal surface of a vehicle, usually a trailer or load conveying body projecting above a driver's cab. Because of the difficulties mentioned, these deflectors are almost invariably installed permanently on a vehicle. They are, as far as applicants are aware, simply not regarded as suitable for use removably on a vehicle. To overcome these problems, numerous inflatable and even self-inflating air deflectors have been proposed.

Thus German Offenlegungsschrift DE No. 31.15.742 describes a self inflating air deflector which is located on the rear panel of a truck for reducing drag. The deflector comprises a substantially flexible bag having an inlet located above the roof of the truck. The deflector is held to a particular shape by means of rope attachments to the truck. It is envisaged that the deflector operates adequately but it will be appreciated that the aerodynamics of the front of the vehicle will not be improved. However, the vehicle front is an area providing considerable wind resistance, particularly vehicles having a substantially flat vertical front surface.

German Offenlegungschrift DE No. 25.11.700 describes, amongst other arrangements, an air deflector arrangement in the form of a narrow, inflatable, part circular cross-sectioned, elongate member extending along the top and side edges on the front of a trailer or semi-trailer of a truck. This deflector may have a centrally located inlet with outlets at the bottom of the side regions of the deflector. The inlet and corners of the deflector are rigid. It is a problem with this form of deflector that it is not easily removable and there is generally a substantial outwardly directed force tending to blow the deflector off the trailer or semi-trailer.

U.S. Pat. No. 3,945,677 describes a self inflatable air deflector which fits on the roof of a truck cab to reduce the wind resistance of an associated trailer or semi-trailer. An air inlet is provided which locates above the windscreen of the truck. The deflector has no inherent means of maintaining a stream-lined shape in use and relies on the shape of the cab to maintain some form of streamlining. It is thus envisaged that substantial bulges may form due to the pressure disparity inside and outside of the deflector. Furthermore, the deflector cannot be used on a frontal wall of a caravan nor may it be attached to the frontal wall of a trailer, semi-trailer or transport container, as it will not maintain a streamlined shape.

It is the object of this invention to provide a self-inflating air deflector which may be used on a front surface of a vehicle and which maintains an effective stream-lined shape in use.

SUMMARY OF THE INVENTION

According to this invention there is provided a self-inflating type of air deflector comprising an inflatable member made of flexible, substantially air impervious sheet material and having at least one air inlet to provide for inflow of air into the member; the air inlet having a substantially rigid periphery and being carried by support means arranged to project the inlet forwardly relative to a front wall of a vehicle or load carrying body in use, the inflatable member including means for the operative attachment thereof over a predetermined area of such frontal wall of the vehicle, the inflatable member being shaped to provide, in the inflated condition, a substantially streamlined, dome-shaped deflector surface over at least a part of the frontal wall of the vehicle.

A particular feature of the invention provides for the inflatable member to assume the form of a flexible bag having a front wall section and a rear wall with the air inlet thereto located in the front section. The inlet is generally formed by an endless frame of rigid material and generally of circular or oval shape.

Alternatively, the inflatable member may assume the form of a shaped sheet having a peripheral edge adapted for association in substantially sealing manner with said frontal wall to form an inflatable enclosure with said area of the frontal wall.

Further features of the invention provide for the air inlet support means to comprise an operatively forwardly projecting arm having its other end supported, in use, on or by the vehicle either directly or indirectly; for said arm to form the stem of a rigid Tee-shaped frame having the free end of the arm or stem thereof attached to the inlet optionally by a pivot or other articulated connection while the cross-bar thereof may either be attached to an upper part of the rear wall of the inflatable member to be orientated in a substantially horizontal plane in use, or the cross-bar may be orientated in a substantially vertical plane and have ends shaped to engage a frontal wall in vertically spaced positions; for the arm to be adjustable in length; for the said arm and stem in the case in which it is substantially horizontal to include a stay operative to hold the support in a forwardly projecting position relative to a surface of a vehicle when the deflector is deflated; for the inflatable member to include air outlets arranged to provide a streamlined flow of air in a boundary layer adjacent the outer surface of the inflatable member and along the sides and roof of the vehicle in use; and for the centre of the air inlet to be located, in the operative position, above the centre of the height of the deflector.

Still further features of the invention provide for the air deflector to be made of optionally fibre reinforced flexible plastics material such as a suitable PVC material, or polyethylene materials which are preferably stabilised against ultra-violet light degradation or, alternatively, any other suitable ultra-violet and solar radiation resistant materials, and for the inflatable air deflector to be made by a fabrication process involving cutting of various pieces of material to predetermined shapes and sizes followed by their bonding together by heat sealing, welding, glueing or stitching or any combination thereof to form the required inflatable deflector.

Preferably the means for attaching the air deflector to a caravan surface assumes the form of a flexible extruded flap or skirt extending along both sides of the inflatable deflector and chosen to correspond with the sides of the area to be covered by the deflector in use.

It is particularly envisaged that the attachment of an air deflector to a caravan can most conveniently be achieved by providing a flange or skirt having, in cross-section, a headed free edge of enlarged cross-sectional shape, conveniently defined by passing a cord through a doubled-over edge thereof, so that the enlarged head can be threaded axially through a co-operating inwardly lipped channel retainer member fixed to the vehicle in the required path. Alternatively, a slide fastener may be employed.

Preferably, means for attaching the air deflector to a shipping container comprises two attachment members each having a projection extending from its upper end, each projection engaging a slot or hole adjacent an upper corner of the container frontal wall with the attachment member extending downwardly toward the centre of the frontal wall and attached to the rear wall of the inflable member; and two lower attachment members which each engage a slot or hole adjacent a lower corner of the frontal wall.

It is particularly envisaged that ropes or belts be used to attach the inflatable member to the lower corners of the frontal wall which will be pulled tight and secured to the lower attachment members by means of over-centre buckles or the like.

It is further envisaged that the deflector may be permanently attached to a trailer or semi-trailer in a substantially airtight manner by providing a substantially endless attachment means on the frontal wall of a vehicle corresponding to the periphery of the deflector.

A feature of this aspect of the invention provides for the inflatable member to comprise a flexible sheet arranged to have its periphery sealed to the front surface of a vehicle in a substantially airtight manner.

Yet further features of the invention provide for the deflector to include two sets of liquid drainage holes, one set arranged to drain liquid when the deflector is deflated and one set arranged to drain liquid when the deflector is inflated; and for the deflectors to include suitable cut-away zones or transparent zones adjacent where they operatively cover lights, gas cylinders, windows and the like.

Various embodiments of the invention will now be described with reference to the accompanying drawings in order that the invention may be more fully understood.

DETAILED DESCRIPTION OF THE DRAWINGS

Figures 1, 2:
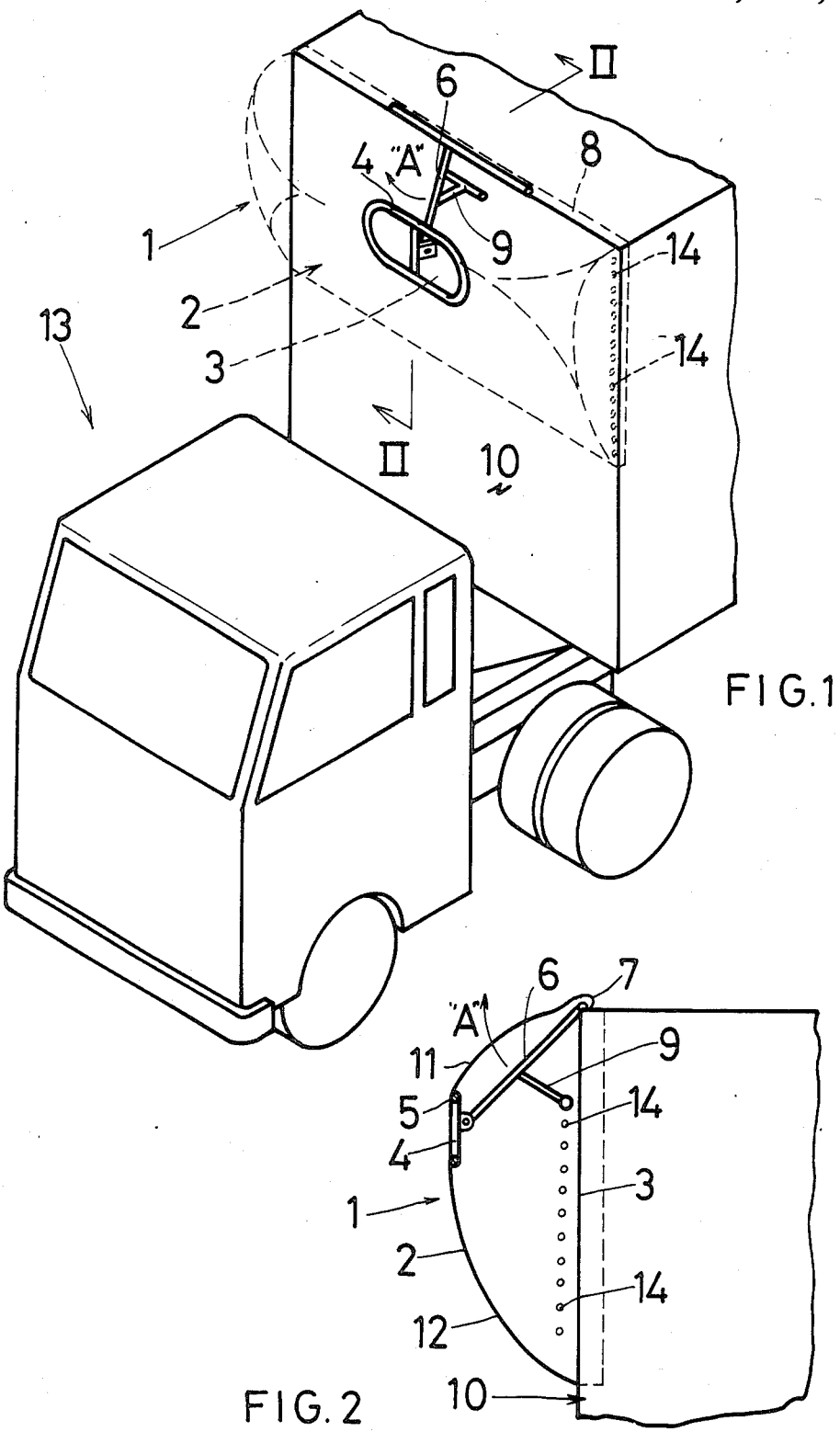
FIG. 1 is a perspective view of one form of air deflector (shown ghosted) showing a Tee-shaped arm and cross-bar arrangement providing an inlet support.
FIG. 2 is a schematic sectional side view of the deflector of FIG. 1.

Referring firstly to FIGS. 1 and 2, there is illustrated, in perspective view, an inflated air deflector attached to a road transport vehicle body. The deflector compises an inflatable member in the form of a flexible bag 1 having a front wall 2 and a rear wall 3. An air inlet 4 is formed by a hole in the front wall with the material of the bag folded around a rigid, oval, endless frame member 5. It is clear however, that any suitable means of attaching the frame to the periphery of the inlet may be used as an alternative to folding of the material about the frame member 4.

Pivotally attached to the frame member 5 is one end of an arm 6 attached at its other end to a cross-bar 7 to form a Tee-shaped frame. The cross-bar 7 is located in an upper peripheral seam 8 joining the rear wall and the front wall. A stay 9 extending downwardly at an incline to the arm serves to maintain the inlet in a forwardly projected position relative to the rear wall 3 which bears against the vehicle frontal wall 10 in use. As will be particularly clear from FIG. 2, the inlet is located well above the centre of the height of the deflector so that the upper section 11 of the front wall is included to the more horizontal disection which the lower section 12 of the frontal wall is more vertical.

In use, the air deflector is attached to the frontal wall 10 of a vehicle 13, simply by attaching at least the corners of the flexible bag to the vehicle, preferably in removable manner. Clearly the deflector will be deflated with the Tee-shaped frame hanging downwardly and resting on the stay 9 which engages the frontal wall of the vehicle.

As the vehicle begins to move forwardly, air will enter the deflector inlet effecting inflation of the deflector. As the deflector inflates, and the pressure increases, the Tee-shaped frame pivots or tends to pivot upwards causing the inlet to move in an arc upwardly as indicated by arrow "A" and further outwardly relatively to the vehicle surface to which it is attached. This is believed to be due to the location of the inlet and the resilient aerofoil effect on the upper and outer surface 11 of the flexible bag. In its equilibrium position, the arm will ensure taughtness of the front deflector wall and hence a streamlined domed shape.

A plurality of small outlet holes 14 or slits may be provided (as shown in FIG. 1) adjacent the top and side edges of the front section. Air passing through such outlet holes provides a boundary layer of streamlined air flow around and onto the sides of the vehicle behind the deflector. Air resistance energy losses may thus be reduced.

The air deflectors may be made of any suitable material such as optionally fibre reinforced flexible plastics material and by a net, make, and trim method as described above.

The method of attachment of the air deflector to a vehicle frontal wall will be determined by the vehicle.

Thus hooks and eyes, screw-threaded fasteners or the like may be employed as may be required, such fasteners generally being provided on or co-operating with the peripheral seam 8. Generally it will be adequate if only the corners of the deflector are attached to the vehicle.

Figure 3:
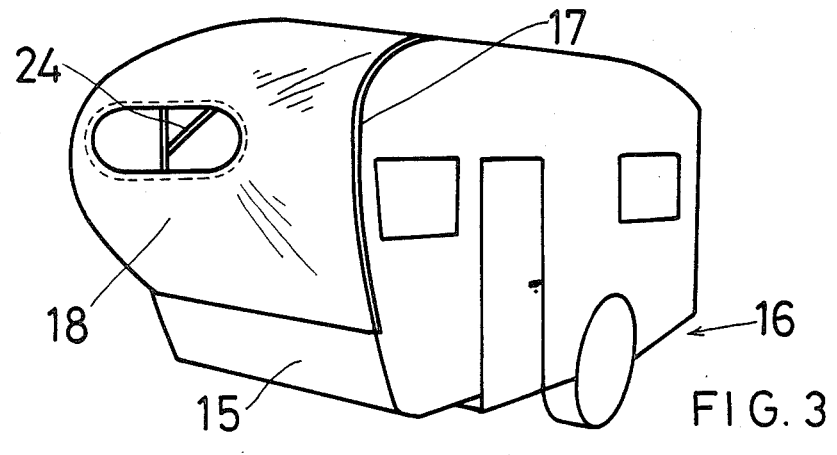
FIG. 3 is a perspective view of an inflated deflector attached to a caravan.
Figure 4:
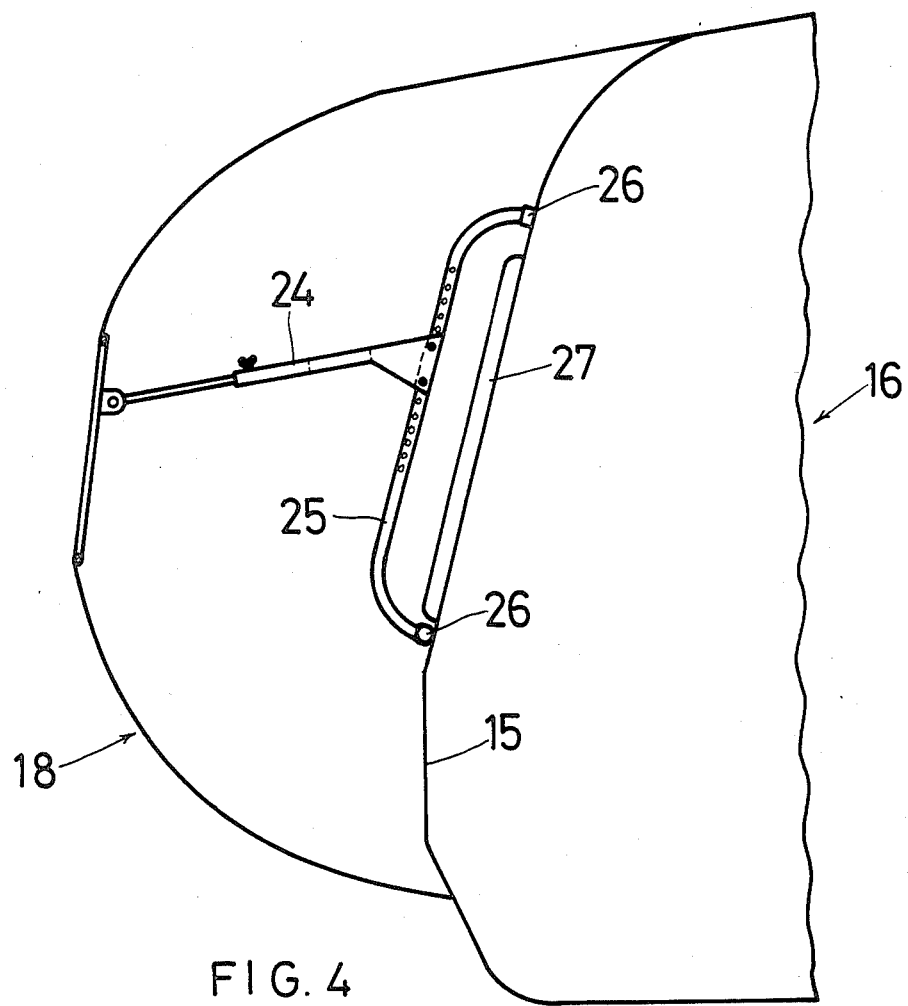
FIG. 4 is a schematic sectional side view of the deflector shown in FIG. 3.
Figure 5:
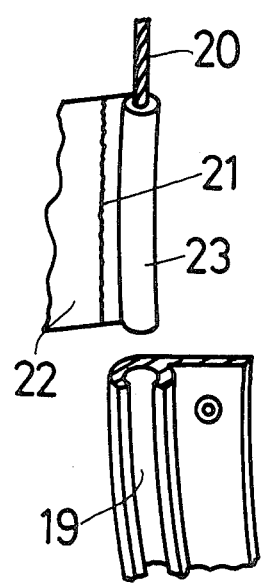
FIG. 5 is a detail showing the method of attachment of the deflector of FIGS. 3 and 4 to the caravan.
Figure 7:
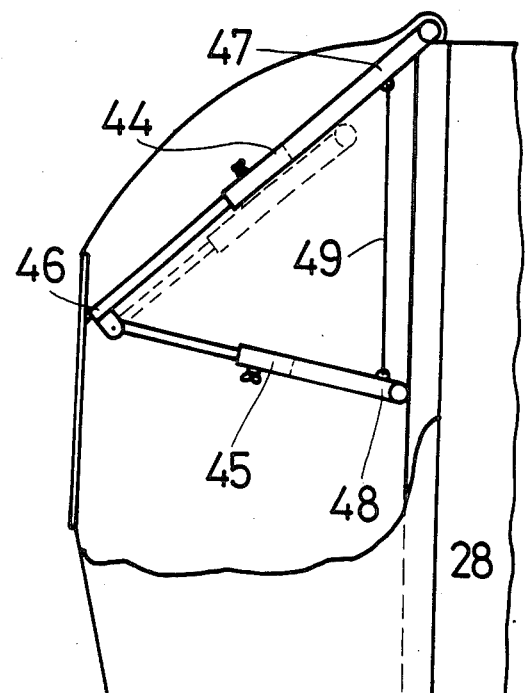
FIG. 7 is a partly sectioned side view of the deflector shown in FIG. 6.
Figure 6:
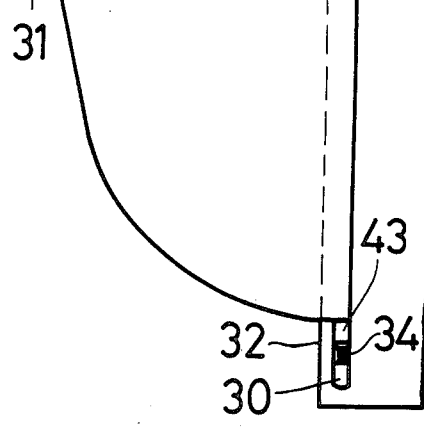
FIG. 6 is an isometric view of the front end of a transport container fitted with an air deflector (shown ghosted) according to the invention.

In the case of a caravan, a similarly made deflector is attached, as shown in FIGS. 3 to 5, to the frontal wall 15 of the caravan 16 but attachment is effected along the entire length of the lateral sides 17 of the deflector 18. A rope 20 is passed through a doubled-over edge 21 of a skirt or flap 22 provided on the edges of the deflector to provide an edge or bead 23 of enlarged cross-section. Each edge or bead is forced or threaded into the lipped channel 19 which is, in any event, commonly provided on the edges of caravans as a standard feature. In this manner, a neat and secure attachment to the vehicle is achieved. However, any suitable form of attachment means, preferably removable, may be used.

The forwardly projecting arm 24 in this case is telescopically adjustable in length and is carried by a cross-bar 25 operatively orientated in the vertical plane. The ends of the cross-bar are bent away from the arm and are provided with transverse feet 26 to engage the frontal wall 15 above and below a window 27.

If a trailer or semi-trailer includes or is fitted with similar lipped channels on the edges of a forward surface, the same attachment method may be used.

It is envisaged that one major application of the invention may well be to transport or shipping containers and such an application is illustrated in FIGS. 6 to 9. It is almost invariable that shipping containers 28 include a number of slots or holes 29 adjacent each upper corner thereof as well as similar slots or holes 30 adjacent the lower corners thereof, such holes being used for lifting or otherwise handling or securing the containers.

Figure 8:
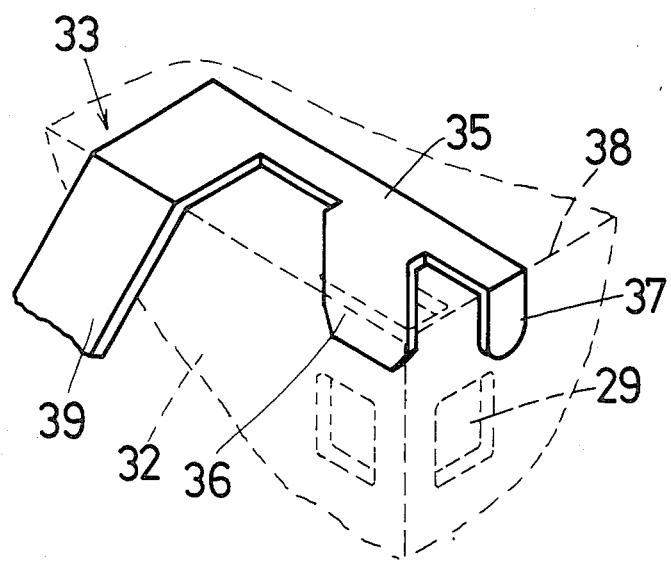
FIG. 8 is an isometric view of an upper attachment member for use on a transport container; and, FIG. 9 is an isometric view of a lower attachment member for use on a transport container.
Figure 9:
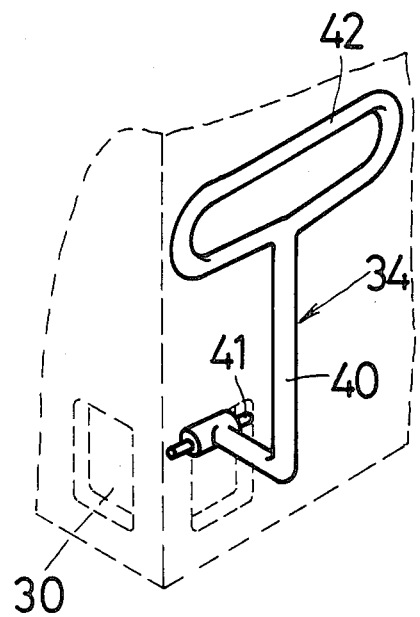

A deflector 31 is mounted to the frontal wall 32 of such a container by upper connectors 33 and lower connectors 34. Each upper connector comprises, as shown in FIG. 8, a member 35 having a slot engaging projection 36 extending therefrom and a locating flange 37 engaging over the upper corner 38 of the container. The member 35 is carried on an elongate handle 39 extending at an incline downwardly and toward the centre of the frontal wall but substantially against said frontal wall. The deflector includes two such upper connectors, one for each upper corner, which are conveniently rivetted, bolted or otherwise secured to the deflector. A person attaching the deflector to a container simply stands adjacent centre of the frontal wall and hooks an upper connector in each set of upper corner slots. The upper edge of the deflector is thus easily attached in position without the use of ladders or additional equipment of any sort. The handle is preferably removable from the connector itself in which case only one handle will be required Each lower connector 34 is then hooked into each bottom slot 30 on the side of the container. A rope or belt 43 which is attached to the deflector is then passed through the eye 42 in the lower connector and tightened. An over-centre buckle (not shown) may be conveniently used for this purpose. The deflector is thus attached and secured to the container in easily removable manner.

It will be understood that an air deflector as above described can also be collapsed for storage and transport with great convenience. To assist in this, the arm 44 has a stay 45 pivotally attached to its outer end 46 with its inner end 47 being attached to the inner end 48 of the stay by a flexible rope 49. Thus the stay and arm can conveniently be folded for storage. The stay may in fact prove to be unnecessary.

It will be understood that any other suitable attachment means may be used. For example, eyelets may be provided along the sides of the deflector tied to the vehicle using such rope.

Further, the deflector may be permanently attached to a trailer or semi-trailer in a semi or airtight manner. Here an endless frame corresponding to the periphery of the deflector is attached to the surface of the vehicle. The frame may include an inwardly turned lip or the like to securely engage a flexible flap or skirt on the periphery of the deflector. However, the deflector may also be screwed or rivetted to the frame. Clearly, the deflector need not be removable in this variant of the invention. Clearly, in this case the deflector does not include a rear wall and only comprises a flexible shaped front wall.

The deflector may include one or two sets of liquid drrainage holes to drain water and the like which may accummulate in the deflector. The holes may be positioned such that one set drains the deflector when inflated and, if necessary, another set drains the deflector when deflated. Also, the deflectors may include cutaway or transparent zones where they operatively cover any one of more of the vehicle gas cylinder, lights, windows and the like.

It will be appreciated that the invention provides a convenient and lightweight air deflector which maintains a streamlined domed shape in use. The inlet support means is entirely located within the deflector and hence does not introduce any vehicle attachment problems but enhances flexibility. The function of the inlet support means is primarily to hold the inlet forwardly, into the air streams, and to hold the deflector material taut. A streamlined domed shape is thus maintained and the problems associated with the prior art self inflatable deflectors are overcome. Clearly, the support has a further function to keep the inlet pointing directly into the incoming air and to prevent excessive lift of the inlet. It is thus envisaged that the deflector according to the invention provides a convenient, flexible and lightweight air deflector which will result in considerable fuel saving in use.

What I claim as new and desire to secure by Letters Patent is:

1. A self-inflating type of air deflector comprising an inflatable member made of flexible, substantially air impervious sheet material and having at least one air inlet to provide for inflow of air into the member; the air inlet having a substantially rigid periphery and being carried by support means arranged to project the inlet forwardly relative to a front wall of a vehicle or load carrying body in use, the inflatable member including means for the operative attachment thereof over a predetermined area of such frontal wall of the vehicle; the inflatable member being shaped to provide, in the inflated condition, a substantially streamlined, dome-shaped deflector surface over at least a part of the frontal wall of the vehicle.

2. An air deflector as claimed in claim 1 in which the inflatable member assumes the form of a flexible bag having a front wall section in which the air inlet is located and a rear wall section attached thereto and engagable with the said frontal wall in use.

3. An air deflector as claimed in claim 1 in which the inflatable member assumes the form of a single flexible wall having a periphery adapted for association in substantially sealing manner with said frontal wall to form an inflatable enclosure with said area of the frontal wall.

4. An air deflector as claimed in claim 1 in which the air inlet comprises an endless frame of rigid material.

5. An air defletor as claimed in claim 4 in which the endless frame is of circular or oval shape.

6. An air deflector as claimed in claim 1 in which the air inlet is carried on one end of an operatively forwardly extending arm, the other end of which is operatively supported on or by the vehicle either directly or indirectly, the arm defining said support means.

7. An air deflector as claimed in claim 6 in which the arm is adjustable in length.

8. An air deflector as claimed in claim 6 in which said other end of the arm is carried by across-bar forming therewith a Tee-shaped frame and wherein the cross-bar provides support for the arm.

9. An air deflector as claimed in claim 8 in which the cross-bar is operatively orientated is a roughly horizontal position and is supported on the vehicle such that the arm can pivot upwardly.

10. An air deflector as claimed in claim 8 in which the cross-bar is operatively orientated in a roughly vertical plane and has ends shaped to engage a frontal wall in vertically spaced positions the arm being pivotable upwardly relative to the cross-bar.

11. An air deflector as claimed in claim 6 in which the arm is pivotable from a lower position to allow the inlet to move upwardly and is supported in such lower position by a stay engageable with the frontal wall in the lower position of the arm.

12. An air deflector as claimed in claim 1 in which the inflatable member has a flap or skirt extending therefrom for co-operation with a complementary arrangement on the vehicle to attach the inflatable member thereto, the flap or skirt extending along at least a substantial part of the sides of the inflatable member.

13. An air deflector as claimed in claim 1 in which two attachment members are secured to the inflatable member, each attachment member having a formation co-operant with a formation on the vehicle to attach the upper region of the inflatable member to two spaced upper regions of the vehicle.

14. An air deflector as claimed in claim 13 in which two attachment members are provided at operatively lower regions of the inflatable member for attachment to co-operating formations on the vehicle.

15. An air deflector as claimed in claim 14 in which the vehicle is a transport container the attachment members each have a projection engageable with a standard hole in the top of each corner of the container and the formations in the lower regions are securable to holes in the lower corners of the container.

16. An air deflector as claimed in claim 15 in which the said formations in the lower regions are securable to said holes through elongate members and overcentre brackets or catches.

17. An air deflector as claimed in claim 1 in which the inflatable member has air outlets at the sides thereof and operative to provide streamlined air flow in a boundary layer at the outsides of the vehicle.

18. An air deflector as claimed in claim 1 in which the inflatable member is fabricated by cutting and bonding pieces of flexible plastics material together.

19. An air deflector as claimed in claim 1 in which the inflatable member is provided with at least one drainage outlet for draining liquids from the interior thereof in use.

20. An air deflector as claimed in claim 1 in which the centre of the air inlet is located above the centre of the height of the deflector.

* * * * *